Aug. 20, 1935. R. L. STOCKARD Re. 19,676
HIGHWAY GUARD FENCE
Original Filed March 21, 1930
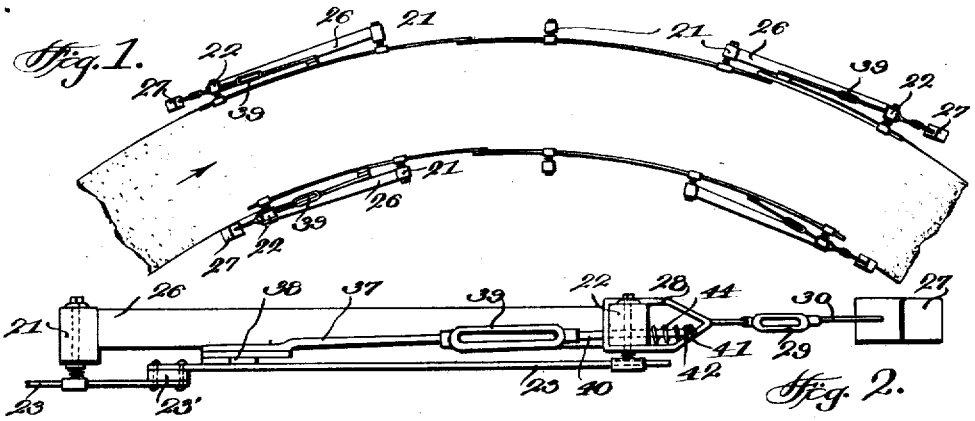
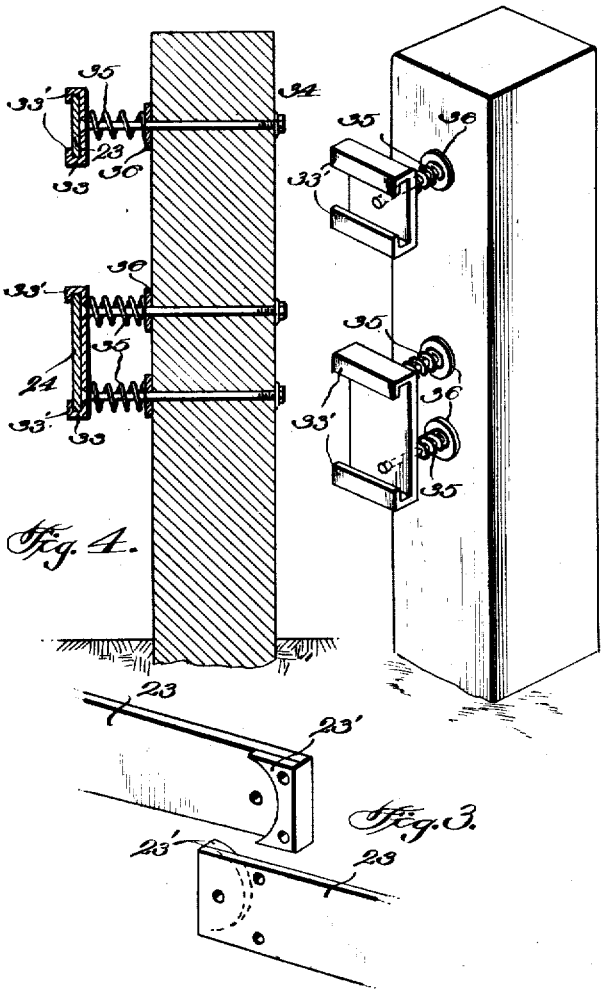
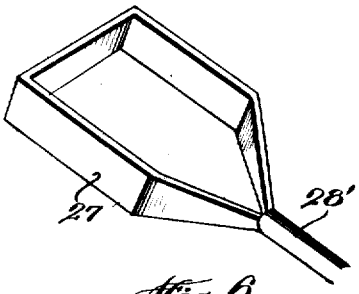
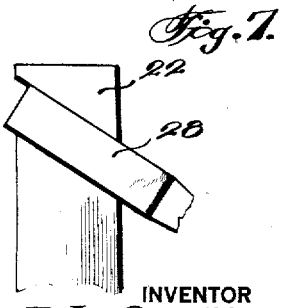
INVENTOR
R. L. Stockard
BY
Munn & Co.
ATTORNEY Reissued Aug. 20, 1935

Re. 19,676

UNITED STATES PATENT OFFICE 19,676

HIGHWAY GUARD FENCE

Robert L. Stockard, Nashville, Tenn., assignor to Eugene V. Camp, Atlanta, Ga.

Original No. 1,847,025, dated February 23, 1932, Serial No. 437,860, March 21, 1930. Application for reissue December 6, 1934, Serial No. 756,376

4 Claims. (Cl. 256—13.1)

This invention appertains to improvements in safety guards generally, and more particularly to fence or railing types of such devices which are to be installed along streets, highways and the like to prevent moving bodies, such as vehicles from leaving the roadway on curves and other points where otherwise accidents and possible loss of life may result.

An object of the invention is to provide a fence or railing structure of the class set forth which is comparatively simple in design, inexpensive to manufacture and install and highly effective and efficient in use.

Another object of the invention is to provide a structure as hereinbefore characterized which will operate to guide a vehicle along the edge of the roadway during any tendency of the same to leave the road sidewise and to prevent the vehicle from leaving the roadway otherwise.

A further object of the invention resides in the provision of means whereby the fence or railing structure will be unaffected by expansion or contraction from natural causes and will resist and absorb shocks incident to impact of vehicles against the same with the least possible chance of damage thereto or to the vehicles themselves.

With the foregoing and other equally important objects and advantages in view, the invention resides in the certain new and useful construction, combination and arrangement of parts as will be hereinafter more fully described, set forth in the appended claims and illustrated in the accompanying drawing, in which:

Figure 1 is a plan view of a section of roadway, showing a practical installation of the improved guard fence or railing thereto;

Figure 2 is a top plan view of the end section of the fence or railing as shown in Figure 1;

Figure 3 is a perspective view of adjacent end portions of a pair of companion rail sections, showing the same in position for joinder;

Figure 4 is a vertical section taken on the line 4—4 of Figure 1;

Figure 5 is a perspective view of a post and bracket structure per se;

Figure 6 is a perspective view of the post engaging end of the guy member or end brace; and Figure 7 is a side elevation of the upper portion of an end fence post and showing the mode of engagement therewith of the attaching loop end of the deadman or brace, which is also in elevation.

Referring to the drawing, wherein like characters of reference designate corresponding parts throughout the several views thereof and more particularly to Figures 1 and 2, the embodiment of the invention, as shown therein by way of example only, is generally constituted in a series of spaced intermediate posts 21 and end posts 22 arranged at desired points along one or both sides of a street or highway just outwardly of the edge or edges of the road bed substantially as is shown in Figure 1.

Each group of the posts 21 and 22 is to support at least two guard rails at the inner sides thereof in superposed parallel relation, the upper guard rail 23 being preferably of less width than the lower guard rail 24. Each of these guard rails 23 and 24 is preferably made up of two or more lengths or sections joined together in end to end overlapped relation. These sections will preferably be made in at least two standard lengths, one being substantially twice the length of the other.

In making a joint between adjacent rail ends, the latter will preferably have short pieces of the same spot welded on the opposed faces of the overlapped end portions thereof, as at 23' (Figure 3), so that the pieces will be disposed in juxta-position and preferably with their opposed end edges in abutted relation, when the rail ends are brought together. The abutted edge of one of the said pieces 23' will preferably be cut to concaved shape and the other made convex, which will permit of the self alinement of the rail sections to compensate for variation of road bed and all vertical curves. Holes for the bolts 25 will be drilled or punched through the overlapped ends of the rail sections, with certain of the same passing through the portions 23', by which arrangement a joint of maximum strength will be provided.

In erecting a fence or railing of this character, the end posts 22 each will preferably be braced in one direction lengthwise of the fence or railing by means of a timber or the like 26 positioned diagonally between the upper end thereof and the lower end or foot portion of an adjacent intermediate post 21, and in the opposite direction to a ground stake or the like 27. The brace or dead man for the latter purpose is made up of a closed loop portion 28, to be engaged over the upper end of the adjacent end post 22, and a straight shank portion 28' extending from the center of the outer side of the loop for screw threaded connection at its free end with one end of a turn buckle 29. The opposite end of the turn buckle 29 is arranged in screw threaded connection with the adjacent end of a rod 30 which has its other end passed through a companion anchor or ground stake 27 and in screw threaded engagement with a nut 31. Interposed between the outer side of the anchor 27 and the nut 31 is an angled washer or the like 32 which cooperates with the nut 31 in a manner to sustain the rod 30 rigidly in axial alinement with the turn buckle 29 and the shank 28' at all times.

The invention contemplates no provision for the positive or rigid securing of the upper end lower rails 23 and 24 to the posts 21 and 22 but to the contrary the same are mounted in position on the inner sides of the post by means of brackets or the like which readily admit of independent movements of the rails relatively to the post and brackets, whether under the influence of expansion and contraction effects due to variable weather conditions or impacts from vehicles.

To this latter end, and as shown, the separate bracket members 33 are provided and each consists of a flat plate which has its opposite upper end lower edges angularly bent to form opposed channeled lugs 33' to receive a guard rail between the same after the manner of the support of the rails in the first instances of the invention. In this case, the upper of the brackets is mounted on the projecting end of a securing bolt 34 passed through a post and is held in spaced relation to the opposed face of the post by means of a coil spring 35 engaged on the bolt end. A bearing plate or washer 36 is also engaged on the bolt 34 and is interposed between the inner end of the coil spring 35 and the post substantially as shown. Similarly, the lower bracket is mounted on the outer projected ends of a pair of bolts 34 and is cushioned on companion coil springs 35 carried on the bolt ends at the outer sides of companion bearing plates or washers 36.

Again referring to Figures 1 and 2, it is to be noted that a tensioning device or shock absorber structure is provided for cooperation with each of the opposite ends of each of the guard rails 23 and 24 and in a manner to cushion the same under the force of impact of a vehicle at the inner sides of the latter. Each of these devices is preferably constituted in a rod section 37, extending parallel to the outer side of a rail adjacent an end thereof and inwardly of the adjacent end post 22. This rod section 37 has its inner end fixedly secured to a mounting 38 which is, in turn, secured in any suitable manner to the opposed side of the rail. The outer or free end of the rod section 37 is connected to one end of a turn buckle or the like 39, which has its opposite end connected to the inner end of a second rod section 40 mounted in the post 22. The outer end of this rod section 40 projects from the outer side of the post 22 and has a nut 41 screw threaded thereon at the outer side of a washer 42. Interposed between the washer 42 and a second washer 43 bearing directly against the adjacent side of the post is a coil spring 44.

From this latter arrangement it will be obvious that, with the tension devices or shock absorber opposing each other at the opposite ends of the guard rails 23 and 24, any endwise movement of the latter, in either or both directions and resulting from the impact of a vehicle against the rails at the inner sides thereof, will be checked thereby and any outward buckling of the rails 23 and 24 to an otherwise possible breaking point will be minimized.

As shown in Figure 7, the inner side face of each of the end posts 22 will preferably be angularly shouldered to seat the front end portion of the looped brace portion 28 flat on the same in order that the parts of each of the braces will be in axial alinement at all times and the bracing effect thereof will be fully effective.

It is also to be noted that the bolts 25 employed at the rail joints, are preferably of oval headed form, galvanized, and the heads thereof are placed on the inner or traffic sides of the rails 23 and 24, in order that a substantially smooth surface will be presented to the opposite line of traffic.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

I claim:

1. A guard fence of the class described comprising a series of posts spaced alongside a roadway, a support secured to the side of each of said posts facing the roadway, a continuous length of flexible metal rail inserted through each of the said supports, compressible means interposed between each of said supports and posts, and spring tensioning means connecting the opposite end portions of each rail to the adjacent end posts and in such a manner as to oppose any buckling of the rails under impact.

2. A guard fence of the class described comprising a series of posts spaced alongside a roadway, upper and lower brackets carried on the side of each of said posts facing the roadway, a continuous length of flexible metal rail inserted through the upper and lower sets of said brackets, spring means interposed between said brackets and said posts, and spring means connecting the opposite end portions of each of said rails to the adjacent end posts and in a manner to tension the rails against undue buckling movements under impact, said first named spring means acting to absorb shocks imparted to the rails when impacted.

3. A guard fence of the class described comprising a series of posts spaced alongside a roadway, brackets spaced vertically of said posts and facing the roadway, a continuous length of flexible metal rail inserted through companion brackets on said posts, compressible means interposed between said brackets and said posts, tensioning means connecting the opposite end portions of each said rails to the adjacent of end posts and in a manner to oppose undue buckling movements under impact, said compressible means acting to absorb shocks imparted to the rails when impacted, and means for bracing said end posts in opposition to the strains and stresses on said rails and said tensioning means.

4. The guard fence as set forth in claim 3 and having the lowermost of said rails of a greater width than that of the uppermost thereof whereby the greater strain of impact will be concentrated toward the grounded portions of said posts.

R. L. STOCKARD.